May 16, 1967  KENZO AIHARA ETAL  3,319,496

LATHE TAILSTOCK

Filed Feb. 11, 1966

United States Patent Office 3,319,496
Patented May 16, 1967

3,319,496
LATHE TAILSTOCK
Kenzo Aihara and Shigeru Tani, Tokyo, and Hideo Hirokawa, Kawasaki, Japan, assignors to Ikegai Tekko Kabushiki Kaisha, Tokyo, Japan
Filed Feb. 11, 1966, Ser. No. 526,883
4 Claims. (Cl. 82—31)

This invention relates in general to a lathe and more particularly to a tail stock device of a lathe comprising a device for effecting both rapid movement and reduction in speed of a tail stock spindle.

It is well known that, in addition to turning of axially elongated articles, a tail stock of a lathe is used to effect drilling by having a drill fitted into the extremity of the associated tail spindle. In either case, it has heretofore practiced to effect reciprocating or axial movement of the tail spindle by using a screw and nut arrangement and manually rotating a handle wheel disposed on the rear end of the tail stock to rotate the nut. Therefore if the tail spindle was desired to be rapidly moved, then the handle wheel was required to effect rapidly many complete revolutions for a short interval of time. Also if a drill large in diameter was used for drilling purpose, a high magnitude of force was required to rotate the handle wheel to advance the drill.

Accordingly it is an object of the invention to provide a tail stock device of a lathe comprising improved means capable of rapidly moving the associated tail stock spindle and including speed reduction means capable of effecting very small incremental movement of the tail stock spindle and therefore a drill secured to the latter relative to rotational movement of the associated handle wheel whereby rapid movement and reduction in speed of the tail stock spindle is selectively effected by a single, manually-operated control or actuation lever member.

With the aforesaid object in view, the invention resides in a tail stock device of a lathe comprising on the rear portion thereof, means for effecting rapid axial movement of the associated tail stock spindle and means driven by a handle wheel for effecting a reduction in speed of the tail stock spindle, characterized in that an interlocking pin member is disposed between the rapid axial movement means and the speed reduction means to maintain one of both said means operated while maintaining the other of both said means stationary and in that a single, manually-operated control or actuation lever member is operative to selectively engage the rapid axial movement means and the speed reduction means to operate only a selected one of both means at a time, the rapid axial movement means being operated by the actuation lever member through unidirectional clutch means.

In a preferred embodiment of the invention a tail stock device of a lathe includes a tail stock spindle and a screw threaded shaft for axially moving the tail stock spindle and may comprise a slide sleeve axially movably mounted on the screw threaded shaft including a rack member on the lower side, a sector gear for meshing the rack member, unidirectional clutch means, a driving grooved sleeve for driving the sector gear through the unidirectional clutch means, a single, manually operated control or actuation lever member having a first operative position where the same engages the driving grooved sleeve to operate the latter and a second operative position, an operating shaft driven by the manually operated control lever member in its second operative position, a rockable arm mounted at an end of a shaft for the sector gear, a first spur gear disposed on rear end portion of the screw threaded shaft and capable of being axially moved through the rockable arm by rotation of the operating shaft, a second spur gear meshable with the first spur gear when the latter is axially moved, a handle wheel for driving the second spur gear, and a reduction gearing disposed between the first and second spur gears.

The invention as to its organization and its method of operation as well as other objects and advantages thereof will become more readily apparent from the following detailed description taken in conjunction with the accompanying drawing in which.

Figure 1:
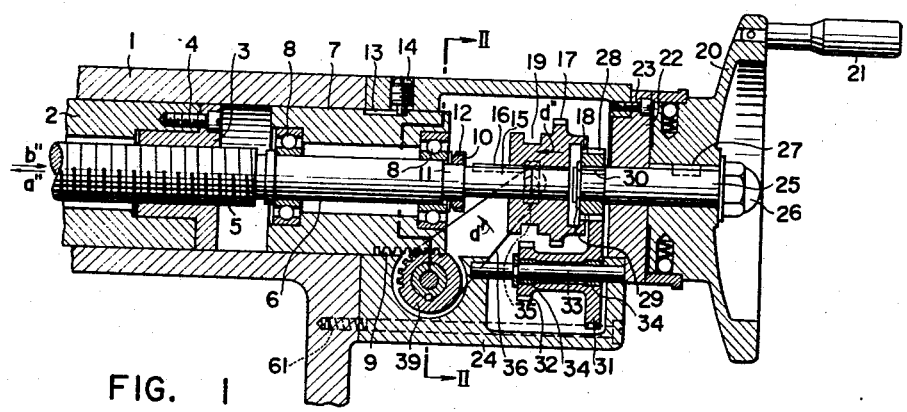
FIG. 1 is a fragmental longitudinal sectional view of a tail stock device constructed in accordance with the teachings of the invention with the section taken along the axis of the associated tail stock spindle.

Referring now to FIG. 1, there is illustrated a tail stock device of a lathe constructed in accordance with the teachings of the invention. The tail stock device illustrated comprises a main hollow body 1, a hollow tail stock spindle 2 disposed within the main hollow body 1 for axially sliding movement and a nut 3 rigidly secured to the tail stock spindle 2 by check bolts 4 screwed into the latter, one of the check bolts being illustrated in FIG. 1. The nut 3 engages a screw-threaded shaft 5 and is adapted to be moved axially of the shaft 5 through rotational movement of the latter.

Supported on the rear extension 6 of the screw-threaded shaft 5 is a slidable sleeve 7 through a pair of spaced angular contact ball bearing 8 disposed at both end of the sleeve and having a rack 9 formed on the lowermost side of the rear portion projecting beyond the rear end of the main hollow body 1. The slidable sleeve 7 is prevented from axially moving relative to the extension 6 and hence to the screw-threaded extension 5 by having both a nut 10 screwed onto a screw-threaded portion 11 rearwardly extending from the extension 6 and a washer 12 interposed between the rear ball bearing and the nut. The sleeve 7 is fitted into the main hollow body 1 of the tail stock for sliding movement of a distance determined by an axially elongated groove 13 formed on the outer periphery and a stop pin 14 planted on the adjacent portion of the internal surface of the hollow body 1 and inserted into the groove 13. The groove 13 and the stop pin 4 serve to prevent rotational movement of the slidable sleeve 7.

The screw-threaded shaft 5 is provided on the rearmost extension 15 continuous to the screw-threaded portion 11 with a key 16 or splines serving to mount a spur gear 17 having its internal gear 18 on the extension 15 for both rotation together with and axial sliding movement along the extension 15. The spur gear 17 includes a circumferential groove 19 for receiving a slide for the purpose of effecting sliding movement.

Disposed on the rear end of the tail stock device is a handle wheel 20 having a handle 21. The handle wheel 20 is carried by a cover block 22 secured by screws 23 (one of which is illustrated in FIG. 1) to the rear end of a gear box 24 mounted on the main body 1 of the tail stock device and fastened on a wheel shaft 25 extending coaxially with the screw-threaded shaft 5 by a fastening nut 26 through a key 27. Thus the handle wheel 20 is located on the extremity of the tail stock device. A spur gear 28 is rigidly secured at the internal end of the shaft 25 projecting into the gear box 24, by a retaining ring 29 keyed at 30 on the shaft 25 and adapted to be driven by the handle wheel 20 through the shaft 25. When the spur gear 17 has reached one limit or sliding movement or its most retrograding position the spur gear 28 will mesh the internal gear 18 thereby to transmit rotational movement of the handle wheel 20 to the screw-threaded shaft 5.

In addition an intermediate gearing comprising a spur gear 31 having a larger diameter and a spur gear 32 less in diameter than the gear 31 and integral with the latter is rotatably supported on an intermediate shaft 33 carried to the gear box 24 by a pair of spaced annuli 34 of white metal. The larger gear 31 continuously meshes the spur gear 28 while the smaller gear 32 can mesh the spur gear 17 only when the latter is in the most advanced position. The spur gears 28, 31, 32 and 17 constitute a reduction gearing.

Figure 2:
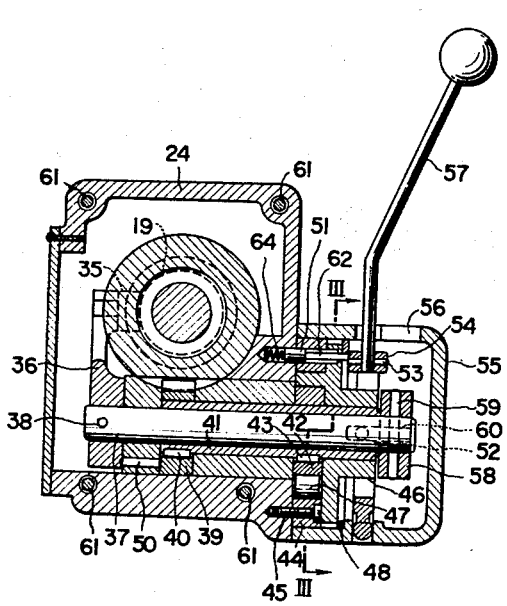
FIG. 2 is an enlarged sectional view taken along the line II—II of FIG. 1.

A description will now be made in conjunction with an operating mechanism for the arrangement thus far described. As shown in FIGS. 1 and 2, the circumferential groove 19 on the spur gear 17 has engaged by a slide 35 supported to a rockable arm 36 at one end. The rockable arm 36 is mounted at the other end on an operating shaft 37 by a pin 38 and is permitted to be rotated along with the operating shaft 37 through a predetermined angle, for example, approximately 15 degrees.

Figure 3:
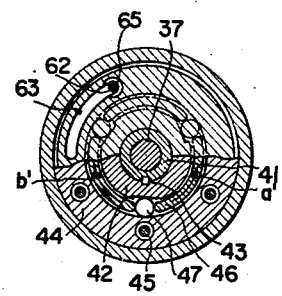
FIG. 3 is a cross sectional view taken along the line III—III of FIG. 2.

Further, a sector gear 39 is keyed at 40 on an outer shell 41 rotatably carried on the operating shaft 37 and meshes the rack 9 on the lower side of the slidable sleeve 7. The operating shaft 37 and the outer shell 41 extend externally of the gear box 24 and has supported thereon a rotation transmission device or a undirectional clutch adjacent the outside of the slide wall of the gear box 24. This unidirectional clutch comprises an inner annulus 42 with key ways secured on the outer periphery of the outer shell 41 by a key 43, an outer annulus 44 disposed on the outside of and concentrical to the inner grooved annulus 42 and fixed to the side wall of the gear box 24 by screws 45 (one of which is illustrated in FIG. 2), a grooved driving sleeve 46 disposed coaxially to the driving sleeve 46 and including a grooved annular portion disposed between the inner and outer annuli, and one roller 47 disposed in both each key way on the inner annulus 42 and each groove on the driving sleeve 46. The rollers 47 are adapted to be driven by the grooved sleeve 46. The driving sleeve 46 includes a disk-shaped part disposed between the cylindrical extension and the above-mentioned grooved annular portion on the outer periphery of the outer shell 41. That disk-shaped part is positioned between a disk-shaped cover 48 screwed at 49 on the outer annulus 44 and the latter against axial movement but for rotational movement. Thus it will be appreciated that the components 42 through 47 just described constitute a unidirectional clutch for permitting rotational movement of the driving sleeve 46 to be transmitted to the outer shell 41 but preventing rotational movement from being transmitted in the reverse direction. The rollers 47 and therefore the key ways on the inner annulus and the grooves on the driving sleeve may be preferably of a triad comprising three elements disposed at substantially equal angular intervals on the respective circle as shown in FIG. 3. However it is to be understood that the rollers, the key way and grooves of any desired number different three may be used, is desired.

Disposed between the rockable arm 36 and the sector gear 39 is an interlocking pin 50 adapted to engage at its extremity of one of the arm and gear 36 and 39 to maintain that one component stationary during the operation of the other component. Further in order to ensure that the sector gear 39 is maintained in its locked position during the operation of the rockable arm 36, another interlocking pin 51 is disposed so as to lock the driving sleeve 46 when a manually operated control lever member as will be later described is in its position c or d which will be also described hereinafter.

Figure 4:
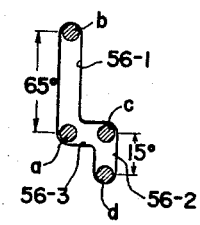
FIG. 4 is a plan view of a guide opening in which a manually operated control or actuation lever member is guided.

The driving sleeve 46 is provided on the outer periphery of the tubular extension with a pair of axial grooves 52 (one of which is shown in FIG. 2) having engaged thereby a pair of driving pins 53 rigidly secured to a driving ring 54. The driving ring 54 is loosely fitted onto the tubular extension of the driving sleeve 46 in such a way as to be rotatable through a predetermined small angle, for example, approximately 65 degrees and also to have its upper portion axially tiltable about its lower pivoted portion pivotably mounted to the internal surface of a casing 55. The casing 55 is provided on the upper wall with a guide opening 56 comprising a pair of offset circumferential opening portion 56–1 and 56–2 and an axial opening portion 56–3 interconnecting the adjacent ends of the portions 56–1 and 56–2 as shown in FIG. 4. A manually operated control or actuation lever member 57 fixed at one end to the driving ring 54 extends through the guide opening 56 into the exterior of the casing 55.

A groove annulus 58 in contact with the rear end of the driving sleeve 46 is rigidly secured on the rear end surface of the operating shaft 37 by a pin 59 and has formed thereon a pair of grooves 60 (one of which is illustrated in FIG. 2) communicating with the grooves 52. If the control lever 57 is manually operated to tilt the upper portion of the driving ring 54 rearwardly then the driving pin 33 will engage the groove 60.

As shown in FIG. 2, the interlocking pin 51 has an intermediate portion 62 of reduced diameter extending through an arcuated slot 63 (see FIG. 3) formed on the driving sleeve 46 and abuts at one end against the end surface of the driving ring 54 by having its other end normally biased by a spring 64 engaging that end toward the driving ring. The driving ring 54 is adapted to be moved by the operation of the control lever 57.

As shown in FIG. 4, the manually operated control lever member 57 has four positions designated by the reference characters a, b, c and d. At the position a, the control lever 57 is ready for effecting rapid axial movement of the tail stock spindle, and at the position c it is ready for operation the reduction gearing. On the other hand, when the control lever 57 is brought into its position b it rapidly moves tail stock spindle in the axial direction and when into its position d it puts the reduction gearing in operation as will be described hereinafter.

When the control lever 57 is in its position a or b, the intermediate portion 62 of the interlocking pin 51 can be freely moved within the arcuated slot 63 to permit the driving sleeve 46 to be freely rotated. However if the control lever 57 is in its position c or d, the end of the interlocking pin 51 disengages from the driving ring 54. Therefore, the spring 64 forces the interlocking pin 51 so as to cause the enlarged portion thereof to engage one end portion of the slot 63 having a larger diameter 65, suitable for retaining the pin in the end portion whereby the driving sleeve 46 is prevented from rotating.

The major parts of the operating mechanism as above described are accommodated in the casing 55 and mounted to the gear box 24 within which the reduction gear mechanism as previously described is disposed. Then the gear box 24 is rigidly secured at the rear end of the main body 1 by a plurality of screws 61 one of which is illustrated in FIG. 2.

The arrangement thus far described is operated as follows:

After the control lever member 56 has been manually rotated from its position illustrated at a in FIG. 4 to its position illustrated at b in the same figure, through a predetermined angle, for example, approximately 65 degrees, the driving pin 53 on the driving ring 54 in engagement with the groove 52 on the driving sleeve 46 causes the latter to be rotated through an angle of approximately 65 degrees in the direction of the arrow b' illustrated in FIG. 3. Therefore, the inner annulus 42 is rotated through the rollers 47 disposed in the grooves on the driving sleeve 46 to rotate both the outer shell 41 and the sector gear 39 keyed thereon in the clockwise direction as viewed in FIG. 1, through the key 43.

Because the sector gear 39 is put in engagement with the rack 9 on the slidable sleeve 7, the rotational movement of the sector gear causes rapid movement of the slidable sleeve 7, the screw-threaded shaft 5 supported thereon and a tail stock spindle 2 screwed into the shaft 5 as a whole in the direction of the arrow $b''$ illustrated in FIG. 1. That is, they retrograde at a high speed.

On the contrary, if the control lever 57 is manually rotated from its position $b$ to its postion $a$ then the driving sleeve 46 is rotated in the direction of the arrow $a'$ as viewed in FIG. 3 to rotate the sector gear 39 in the counterclockwise direction as viewed in FIG. 1. This rotational movement of the sector gear 37 is accompanied by rapid movement of the tail stock spindle 2 along with the slidable sleeve 7 in the direction of the arrow $a''$ illustrated in FIG. 1 and indeed advance of them. Under these circumstances, a force for forcing the tail stock spindle 2 tends reversely to rotate the sector gear 39 in the clockwise direction as viewed in FIG. 1. However, the rollers 47 now in engagement with the narrow portion of the wedge-shaped groove on the inner annulus 42 prevents rotational movement of the latter resulting in the impossibilitiy of reversely forcing the tail stock spindle 2.

It is now assumed that the control lever 57 has been manually moved from its position $a$ to its position $c$ ilustrated in FIG. 4 to be rearwardly tilted. As previously described, the control lever 57 is ready for operating the reduction gearing. Then the upper portion of the driving ring 54 is tilted rearwardly and the driving pin 53 is transferred from the groove 51 to the groove 59 on the grooved ring 57. Accordingly, after the control lever 57 has been rotated from its position $c$ to its position $d$ (see FIG. 4) through a predetermined angle, for example, approximately 15 degrees, the grooved annulus 58 is rotated and the operating shaft 37 moves the rockable arm 36 in the direction of the arrow $d'$ illustrated in FIG. 1. This movement of the arm causes the spur gear 17 having the slide 35 in engagement with the circumferential groove 19 to move the slide 35 in the direction of the arrow $d''$ illustrated in FIG. 1 thereby to disengage internal gear 18 from the spur gear 28 while at the same time engaging the spur gear 17 with the intermediate spur gear 32. This permits the screw-threaded shaft 5 to be operatively coupled to the wheel shaft 25 through a reduction gear device composed of the spur gears 28, 31, 32 and 17 and having a high reduction ratio. Under these circumstances, the screw-threaded shaft 5 reduces in a speed corresponding to a fraction of the number of revolution of the handle wheel 20 permitting very small incremental movement of the tail stock spindle 2. Therefore, if a drill having a large diameter is used to perform a drilling operation, the handle wheel is required only to be operated with a low force, resulting in a simple operation.

From the foregoing, it will be appreciated that the prsent invention has provided a tail stock device of a lathe including a single manually operated control lever adapted to rapidly transfer a tail stock spindle from rapid movements to very small incremental movements caused by a handle wheel and vice versa in a simple manner. While the invention has been illustrated and described with reference to a preferred embodiment thereof, it is to be understood that various changes in the details of construction and the combination and arrangement of parts may be resorted to without departing from the spirit and scope of the invention.

What we claim is:

1. In a tail stock device of a lathe comprising a tail stock spindle, the combination of means disposed on the rear portion of the tail stock device for effecting rapid axial movement of said tail stock spindle, means disposed on the rear portion of the tail stock device driven by a handle wheel to effect reduction in speed of said tail stock spindle, an interlocking pin member disposed between said rapid axial movement means and said speed reduction means to maintain one of both said means operated while maintaining the other of both said means stationary, a single manually operated control lever member for selectively engaging said rapid axial movement means and said speed reduction means to operate only one of both said means at a time, and unidirectional clutch means through which said rapid axial movement means are operated by said manually operated control lever member.

2. In a tail stock device of a lathe comprising a tail stock spindle and a screw-threaded shaft for axially moving the tail stock spindle, the combination of a slide sleeve axially movably mounted on the screw-threaded shaft including a rack member on the lower side, a sector gear for meshing the rack member, unidirectional clutch means, a driving grooved sleeve member for driving said sector gear through said unidirectional clutch means, a single, manually operated control lever member having a first operative position where the same engages said driving grooved sleeve member to operate the latter and a second operative position, an operating shaft driven by said manually operated control lever member in its second operative position, a rockable arm mounted at an end of a shaft for the sector gear, a first spur gear disposed on rear end portion of said screw-threaded shaft and capable of being axially moved through said rockable arm by rotation of the operating shaft, a second spur gear meshable with said first spur gear when the latter is axially moved, a handle wheel for driving said second spur gear, and a reduction gearing disposed between said first and second spur gears.

3. In a tail stock device of a lathe comprising a tail stock spindle, a screw threaded shaft for axially moving the tail stock spindle, and a handle wheel on the rear end of the device for driving the screw-threaded shaft, the combination of a slide sleeve mounted on said screw-threaded shaft for axial movement along with the latter and having a rack member disposed on the lowermost side, a sector gear for meshing said rack member, unidirectional clutch means, a driving grooved sleeve member for driving said sector gear through said unidirectional clutch means, reduction gear means disposed on the rear end portion of said screw-threaded shaft, an operating shaft disposed coaxially within said driving grooved sleeve for movement independent of the latter, a rockable arm rockably mounted on said operating shaft at one end and having a first operative position where the same operatively connects said handle wheel directly to said screw-threaded shaft and a second operative position where it operatively connects said handle wheel to said screw-threaded shaft through said reduction gear means, a grooved annulus formed on said operating shaft at the other end, a driving ring member disposed around the outer periphery of said driving sleeve so as to be pivotable about a point on the outer periphery to cause a pair of driving pins on the inner periphery to selectively engage a pair of grooves on said driving grooved sleeve and a pair of grooves on said grooved annulus, and a manually operated control lever means for controlling said driving ring member.

4. In a tail stock device of a lathe comprising a tail stock spindle, a screw-threaded shaft for axially moving the tail stock spindle and a handle wheel on the rear end of the device for driving the screw-threaded shaft, the combination of a slide sleeve mounted on said screw-threaded shaft for axial movement along with the latter and having a rack member disposed on the lowermost side, a sector gear for meshing said rack member, unidirectional clutch means, a driving grooved sleeve member for driving said sector gear through said unidirectional clutch means, reduction gear means disposed on the rear end portion of said screw-threaded shaft capable of operatively connecting said handle wheel to said screw-threaded shaft, a rockable arm rockably mounted on said driving grooved sleeve to move said reduction gear means to change the reduction ratio, an interlocking pin member for selectively engaging the end surface of said rockable arm and the end surface of said driving grooved sleeve to lock said rockable arm while maintaining said driving grooved sleeve and vice versa, an operating shaft disposed coaxially within said driving grooved sleeve member for movement independent of the latter, said operating shaft having said rockable arm mounted at one end, a grooved annulus formed at the other end of said operating shaft, a driving ring member disposed around the outer periphery of said driving sleeve so as to be pivotable about a point on the outer periphery to cause a pair of driving pins on the inner periphery to selectively engage a pair of grooves on said driving grooved sleeve member and a pair of grooves on said grooved annulus, a manually operated control lever member for controlling said driving ring member, and another interlocking pin member extending through a disk forming a part of said unidirectional clutch means and having one end engaging a stationary part of the device and the other end abutting against the side end surface of said driving ring member, said another interlocking pin member being axially movable through movement of said driving ring member to lock said disk.

References Cited by the Examiner

UNITED STATES PATENTS

| | | | |
|---|---|---|---|
| 2,865,242 | 12/1958 | Kemper et al. | 82—31 |
| 2,874,600 | 2/1959 | Jeanneret | 82—31 |

WILLIAM W. DYER, Jr., *Primary Examiner.*

LEONIDAS VLACHOS, *Examiner.*